United States Patent [19]

Nyberg

[11] Patent Number: 5,326,186
[45] Date of Patent: Jul. 5, 1994

[54] ROBOT FRIENDLY PROBE AND SOCKET ASSEMBLY

[75] Inventor: Karen L. Nyberg, Vining, Minn.

[73] Assignee: The United States of America as represented by the Administrator of the National Aeronautics and Space Administration, Washington, D.C.

[21] Appl. No.: 993,744

[22] Filed: Dec. 14, 1992

[51] Int. Cl.⁵ .................... F16D 1/00; F16B 3/00
[52] U.S. Cl. .................... 403/378; 403/379; 403/359; 403/327; 403/328; 403/325
[58] Field of Search ........... 463/328, 327, 326, 325, 463/354, 378, 379, 377

[56] References Cited

U.S. PATENT DOCUMENTS

| | | | |
|---|---|---|---|
| 2,974,965 | 3/1961 | Welles | 403/378 |
| 3,531,144 | 9/1970 | Bizilia | 403/377 |
| 4,318,630 | 3/1982 | Herchenbach | 403/359 |
| 4,392,759 | 7/1983 | Cook | 403/359 |
| 4,711,595 | 12/1987 | Magid | 403/379 |
| 4,854,777 | 8/1989 | Lemoine et al. | |
| 4,867,595 | 9/1989 | Hoffman | |
| 4,963,052 | 10/1990 | Bush et al. | |

Primary Examiner—Randolph A. Reese
Assistant Examiner—Anthony Knight
Attorney, Agent, or Firm—Russell E. Schlorff; Guy M. Miller; Edward K. Fein

[57] ABSTRACT

A probe and socket assembly (10) for serving as a mechanical interface. The assembly comprising a socket (11) having a housing (14) adapted for connection to a first supporting structure and a probe (12) which is readily connectable to a second structure and is designed to be easily grappled and manipulated by a robotic device for insertion and coupling with the socket. Cooperable automatic locking means (35, 49) are provided on the probe shaft (43) and socket housing (14) for automatically locking the probe in the socket when the probe is inserted a predetermined distance. A second cooperable locking means (92, 25) on the probe shaft (43) and housing (14) are adapted for actuation after the probe has been inserted the predetermined distance. Actuation means (80, 62) mounted on the probe are responsive to the grip of the probe handle by a gripping device, such as a robot for conditioning the probe for insertion and are also responsive to release of the grip of the probe handle (51) to actuate the second locking means to provide a "hard" lock of the probe in the socket.

10 Claims, 3 Drawing Sheets

ROBOT FRIENDLY PROBE AND SOCKET ASSEMBLY

ORIGIN OF THE INVENTION

The invention described herein was made in the performance of work under a NASA contract and is subject to the provisions of Section 305 of the National Aeronautics and Space Act of 1958, Public Law (72 Stat. 435; 42 USC 2457).

FIELD OF THE INVENTION

The invention relates to a probe and socket assembly for serving as a mechanical interface between structures and more particularly to a probe and socket assembly having a probe which can be readily grappled and manipulated by a robotic device for releasable coupling with the socket of the assembly.

BACKGROUND OF THE INVENTION

When it is necessary to perform work in an unfriendly dangerous environment, it is desirable to minimize or eliminate the human involvement wherever possible. In the zero gravity environment of space or in a subsea environment, such tasks as operating work tools for the erection, repair or maintenance of structures and equipment, are usually very time consuming endeavors, difficult and frequently require exposing the human participants to considerable risks. In many instances, their time and skills could be better spent at other tasks. Accordingly, simplicity in design for structural joints and mechanical interfaces, for example, such that robotic devices can be used in erecting space structures is an ever present goal. However, most mechanical connectors, particularly of the probe and socket type as shown in U.S. Pat. Nos. 4,963,052 and 4,854,777, are usually complex devices which are not readily adaptable to robotic intervention. While various forms of coupling apparatus have been designed for use by robotic devices, such as the coupling apparatus shown in U.S. Pat. No. 4,865,595, these are usually designed for very specific applications.

SUMMARY OF THE INVENTION

The invention is a probe and socket assembly for use as a mechanical interface between structures. The assembly comprises a socket housing adapted to be rigidly connected to a supporting structure and which is provided with an opening therein for providing a socket. The probe comprises a probe shaft and a probe handle to which a second structure can be readily attached and which is adapted to be gripped by a robotic device whereby the probe may be inserted into the socket. Cooperable automatic locking means are provided on the probe shaft and the socket housing for automatically accomplishing a "soft" lock of the probe in the socket when the probe shaft is inserted a predetermined distance. A second cooperable locking means is provided on the probe shaft and socket housing which are adapted for actuation after the probe shaft has been inserted the predetermined distance. The probe is provided with an actuating mechanism which is responsive to gripping of the probe handle to condition the probe for insertion into the socket and is also responsive to release of the probe handle grip to actuate the second locking means and effect a "hard" lock of the probe in the socket.

DETAILED DESCRIPTION OF THE INVENTION

Figure 1:
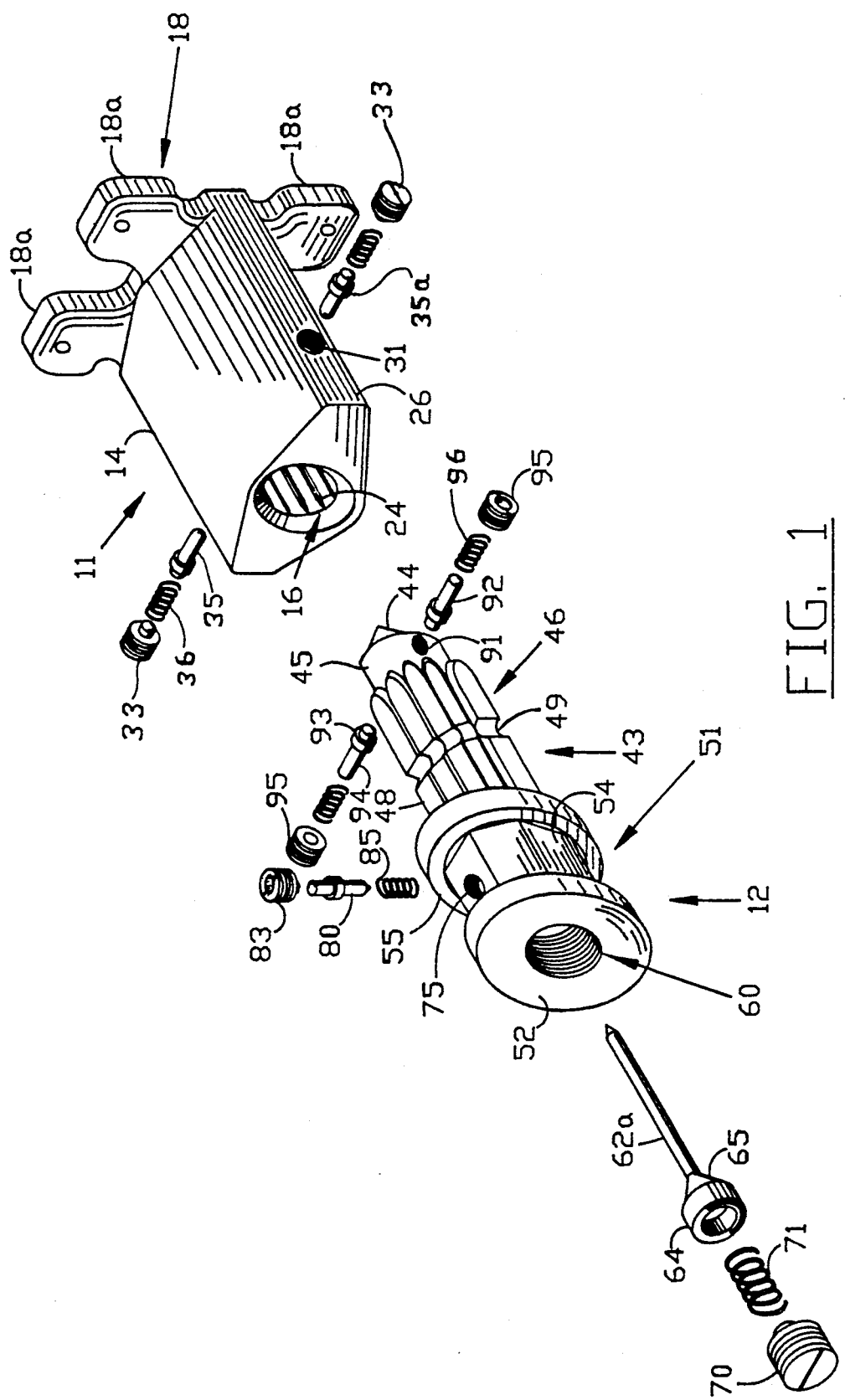
FIG. 1 is an exploded view in perspective of a probe and socket assembly representing a preferred embodiment of the invention.

Referring more particularly to the drawings, there is shown in FIG. 1 in exploded view, a probe and socket assembly representing a preferred embodiment of the invention. The socket component 11 of the invention is adapted to be mounted on a structure in a location where it is positioned to receive and couple to the probe component 12 of the invention.

The socket component 11 comprises an elongate housing 14 having a central axial opening 16 extending therethrough. At one end, the housing 14 is provided with an external radially extending flange 18 comprised of four ear-like appendages 18a, each of which is provided with a bolt hole extending through the appendage in the longitudinal direction of the housing 14 for accommodating its bolted connection to an adjoining structure. From its flanged end, the axial opening 16 includes a smooth bore section 21, an intermediate larger diameter splined section 22 and a frusto-conical surface 23 which opens at the other end of the housing 14 and tapers inwardly therefrom. The inner wall of the intermediate section 22 is provided with a plurality of longitudinally extending splines 24 in uniform spacing. The inner wall of the smooth bore section 21 is provided with an annular groove 25 coaxial with the central axis of the socket 11.

In radial cross section, the exterior surface of the socket is of generally elliptical form which at its widest diameter is provided with flattened planar surfaces 26.

Intermediate its ends, the socket housing 14 is provided with a pair of diametrically opposed radial bores 31 which extend through the wall of the housing into the axial opening 16 at locations approximately equidistant from the ends of the splined section 22 of the opening 16. Each radial bore 31 is formed with a large diameter outer end section 31a which is threaded for accommodating a lock pin retainer 33, a smaller diameter intermediate counterbore section 31b and a still smaller counter bore section 31c which opens into the axial opening 16. The intermediate counterbore section 31b is adapted to receive a lock-pin 35 with a coiled spring 36 sleeved about the shaft of the lock pin. Each lock pin 35 intermediate its ends is provided with an annular flange 35a, and the coiled spring 36 is installed to bias the lock pin 35 inwardly with one end of the spring 36 in abutting engagement with the lock pin retainer 33 and its other end in abutting engagement with the flange 35a. The internal annular shoulder formed at the junction of the bore sections 31b and 31c also serves as a retainer for the lock pin 35, the shaft of which normally extends into the axial opening 16 biased by the spring 36.

The probe component 12 of the invention comprises an elongate body which is symmetrical about a central longitudinal axis 41. The probe 12 includes a shaft portion 43 with a conical tip 44, an adjacent cylindrical section 45 with smooth exterior surface, and a splined section 46 with a plurality of longitudinally extending splines 48.

The plurality of splines 48 are each formed with an external groove at a location intermediate its ends which is the same for each spline such that the plurality of grooves represent, in effect, a single external annular groove 49 on the shaft 43. The groove 49 is adapted to serve as a locking groove when it is engaged by the tips of the lock pins 35 in the socket 11 in a manner to be hereinafter described.

The probe 12 is also provided with a handle section 51 at the end thereof remote from its conical tip 44. The handle section 51 includes a grappling section 54 located between an annular radial flange 52 at its remote end and a second annular flange 55 which adjoins the splined section 46 of the probe. The grappling section 54 is hexagonal in radial cross section and is of sufficient longitudinal extent to accommodate the jaws of a grappling tool or robotic end effector placed between the flanges 52 and 55.

The probe 12 is further provided with a central axial blind bore 60 which extends from the probe end 42 to an end-point near the conical tip 44. The bore 60 is comprised of a large diameter section 60a extending inward from the probe end, a counterbore section 60b and a still smaller diameter counterbore section 60c. The bore 60 receives therein an axial pin 62 with an elongate shaft 62a and an enlarged head. The head is of a diameter slightly smaller than that of the bore section 60a so as to be slidable therein and the shaft 62a of pin 62 is of a diameter slightly smaller than that of the bore section 60b. The head includes an outer cylindrical surface 64 and a frusto-conical surface 65 which tapers inwardly from the cylindrical surface 64 to adjoin the shaft 62a.

The axial pin 62 is retained in the bore 60 by a retainer 70 which is threaded into the bore section 60a. The pin 62 is also biased towards an innermost position in bore 60 by means of a coiled spring 71 which seats with one end in a cup-like recess 72 formed in the end surface of the head of the pin 62 and its other end in abutting relation with the inner surface of the retainer 70. The grappling section 54 of the probe is provided with a radial bore 75 comprising a large diameter outer section 75a and a smaller diameter counterbore 75b, which extends into the axial bore 60. The radial bore 75 accommodates an actuator pin 80 with a shaft 81, having a conical tip 81a and an annular shoulder 81b intermediate its ends. The pin 80 is retained in the bore 75 by a retainer 83 which is threaded into the outer end of bore section 75a. The pin 81 is normally positioned in the bore 75 with its shoulder 81b in abutting engagement with the retainer 83 and it is biased to this position by a coiled spring 85 which seats in the bore section 75a in sleeved relation to the shaft of the adapter pin 81. When in this spring-biased position, the tip 81a of the actuator pin engages the frusto-conical surface 65 of the axial pin 62 and the outer end of the shaft protrudes beyond the surface of the grappling section of the probe.

Adjacent the conical tip 44 of the probe 12, a pair of diametrically opposed and radially extending bores 91 are provided in the smooth cylindrical section 45 of the probe shaft. Each bore 91 accommodates a locking pin, such as a probe locking pin 92 having an annular flange 93 formed about the shaft 94 of the pin and located closer to the inner conical tip of the shaft than its outer end. Each locking pin 92 is slidably mounted in its associated bore 91 and retained therein by an externally threaded retainer 95 which is threaded into the outer end of the radial bore 91. The outer end portion of each bore 91 is formed with internal threads for accommodating the retainer 95, and each retainer 95 is provided with a central axial opening for receiving the outer end portion of the pin shaft 94 which extends therethrough.

Each probe locking pin 92 is provided with a coiled spring 96 which is sleeved about the pin shaft 94 on the outer portion thereof. At one end the coiled spring 96 engages the retainer 95 and at its other end it is in abutting engagement with the shoulder provided by the annular flange 93 of the pin 92. The springs 96 therefore bias the locking pins 92 in an inwardly direction such that the tips of the pins 92 engage the shank of the axial pin 16 when axial pin 16 is in its innermost position, such as shown in FIG. 2.

Figure 2:
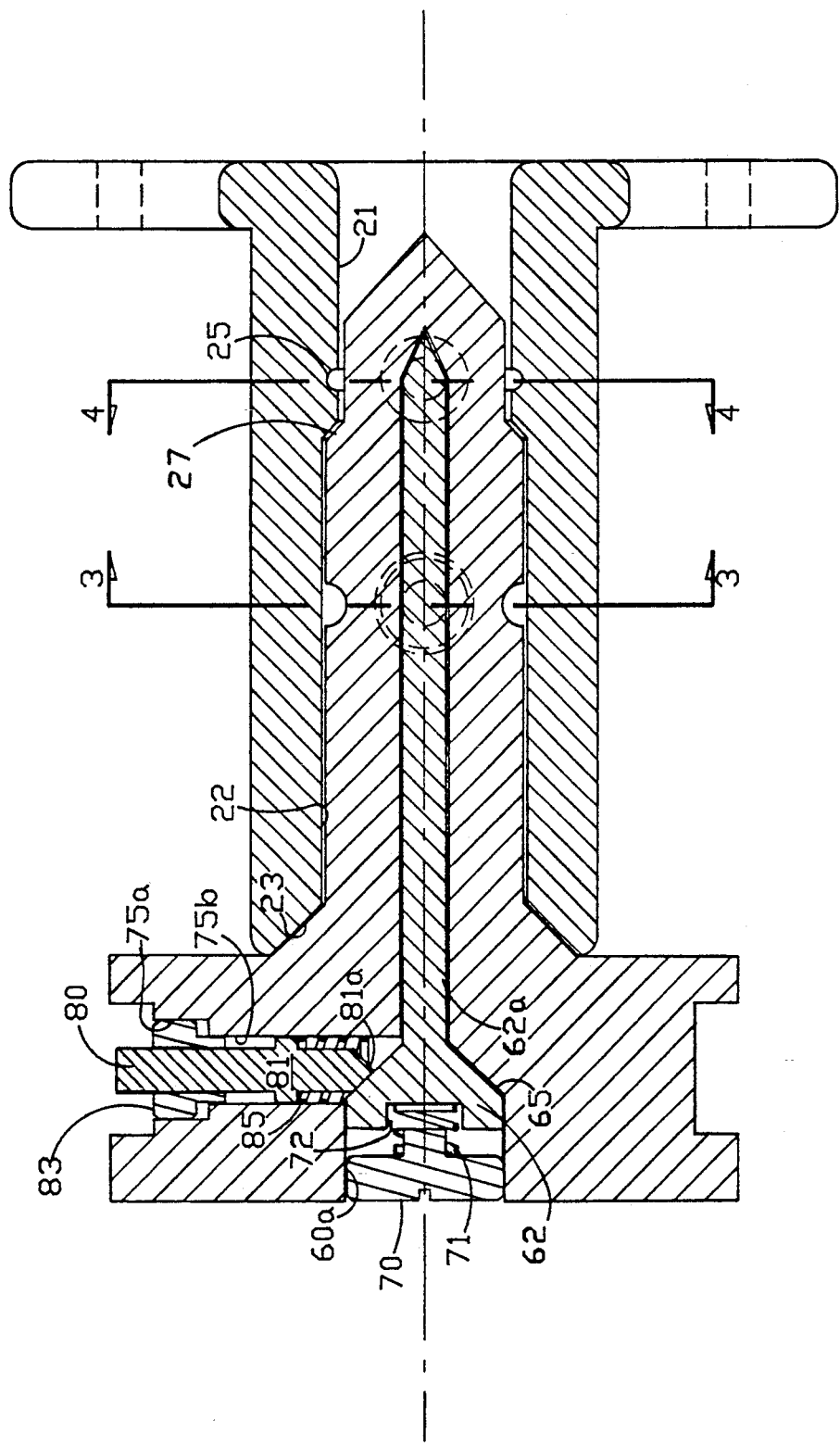
FIG. 2 is an enlarged side view, partly in section, showing the coupling of the probe and socket components of the invention.
Figure 4:
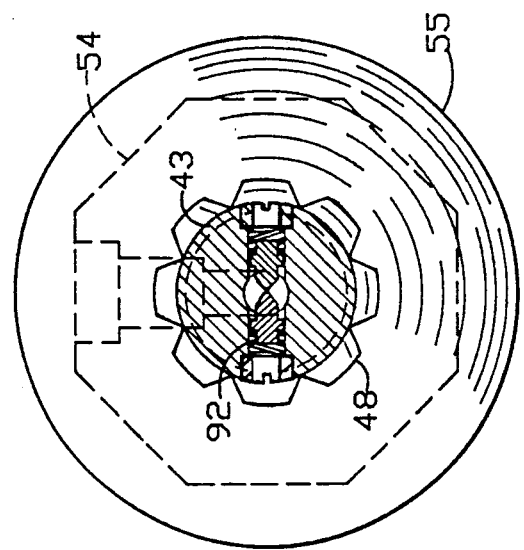
FIG. 4 is a section view as taken along the section line 4—4 of FIG. 2.
Figure 3:
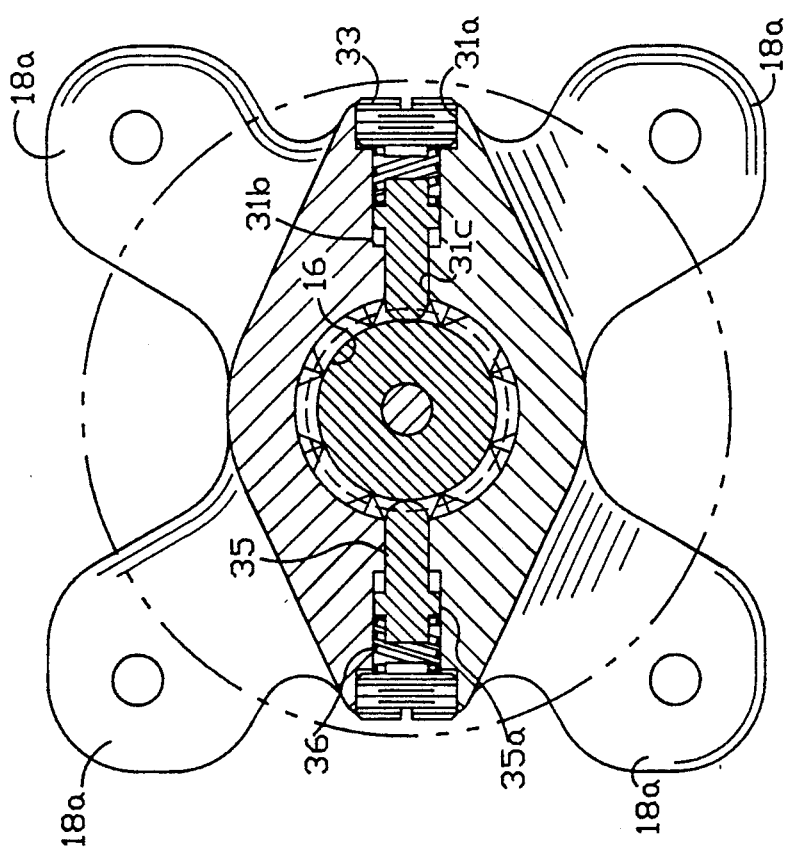
FIG. 3 is a section view as taken along the section line 3—3 of FIG. 2.

It will thus be seen that as the actuator pin 80 is pushed axially inward, its conical tip 81a will exert a camming action against the frusto-conical surface 65 of the pin head 62b and drive the axial pin 62 to the left as seen in FIG. 2 and further compressing the coiled spring 71. As a further result of the outward axial movement of the pin 62, the shaft of the pin 62 is withdrawn from engagement with the probe locking pins 92 and the locking pins 92 are driven inwardly by their springs 96 to an innermost position such that their shafts no longer project outward beyond the retainers 95. In this condition, the probe is ready for insertion into the socket assembly.

With the robotic device maintaining its grapple of the probe assembly, and the actuator pin 80 being held in its inner position, the probe is moved towards the socket assembly so that the conical tip 44 of the probe will enter the axial opening 16 of the socket assembly, guided by the frusto-conical surface 23 at the mouth of the socket. The socket splines 24 and probe splines 48, which are adapted to intermesh one with the other, serve as guides for alignment of the probe and socket thereby eliminating any binding between and socket during installation.

During its travel into the socket, the probe shaft 43 cams the socket lock pins 35 outwardly. However, when the probe bottoms out in the socket with its splines 48 engaging the annular shoulder 27 formed at the junction of the bore sections 21 and 22, the socket's lock pins 35 are urged into the mid-spline groove 49 in the probe splines 48 and thereby provide a preliminary "soft lock" of the probe shaft in the socket assembly.

The bottoming of the probe in the socket is also a signal for controlling the robotic device to release its grip of the probe assembly. The robot's release of the probe by its robot controls, results in the actuator pin 80 moving outwardly under the biasing force of the spring 85 and allowing the axial pin 62 to be driven by the spring 71 to its innermost position in the probe 60 as shown in FIG. 2. During the inward movement of the axial pin 62, the conical tip engages the conical tips of the probe locking pins 92 and cams these pins outwardly to where their shafts project outward from the retainers 95 and interact with the annular groove 25 in the inner wall of the socket to provide a "hard lock" of the probe in the socket which will stand a far greater axial force than that provided by the "soft lock" of the socket lock pins.

It is therefore to be appreciated that the invention described herein provides for the grasping of a probe assembly by a robotic arm, a single-handed straight forward motion for its insertion into a compatible socket assembly, and its release by the robot to effect the coupling of the probe and socket. The probe is provided with a handle which is designed to permit rigid grappling and also allow for an uncomplicated motion in the driving insertion of the probe and its release by the robot to effect a coupling. The probe and socket assembly of the invention is useful in providing a mechanical interface between connecting structures and most particularly in a hostile environment where a robot can be used in the assembly or dismantling of structures and thereby reduce the exposure of humans to environmental hazards.

The probe component of the invention can easily be made suitable for accommodating its connection to structural members such as a rod or tubular member which might be connected thereto as by threads, bolts, or connecting pins to provide a stanchion for a work station in the zero gravity space environment. In most instances, the stanchion or other structural member would be attached to the probe prior to its installation in the socket assembly.

It is also to be appreciated that after installation, the probe can be released from the socket by first re-gripping of the probe handle to actuate the actuator pin 80 and axial pin 62 to allow retraction of the locking pins 92 into the bore 60 and out of engagement with the socket groove 25. With the "hard" lock removed, the probe shaft can then be pulled out of the socket with an axial force which is minimally sufficient to overcome the biasing force of the springs 36 which hold the lock pins 35 in the mid-spline groove 49.

It is also to be appreciated that the foregoing description of the invention has been presented for purposes of illustration and explanation and is not intended to limit the invention to the precise form disclosed. For example, the length and shape of the probe handle can be varied considerably to accommodate its interconnection with a wide variety of structures which are to be coupled to the structure which is bolted to the socket assembly. Also, depending on the expected axial loads, a single socket lock pin and a single probe locking pin might be used in lieu of pairs of such pins. It is to be appreciated therefore that changes may be made by those skilled in the art without departing from the spirit of the invention.

What is claimed is:

1. A probe and socket assembly adapted for use as a mechanical interface between structures, said assembly comprising:
    a socket housing adapted for a rigid connection to a supporting structure, said housing having an axial opening extending therein, with said opening and the wall which defines said opening providing a socket;
    a probe comprising a probe shaft and a probe handle adjoining said shaft;
    automatic cooperable locking means on said probe shaft and said socket housing for automatically soft locking of the probe in said socket when the probe shaft is inserted a predetermined distance therein;
    cooperable releasable second locking means on said probe shaft and said socket housing for hard locking of the probe in said socket; and
    actuation means mounted on the probe handle for releasing the second locking means to permit withdrawal of the probe from the socket.

2. A probe and shaft assembly as set forth in claim 1 further including cooperable alignment means on said shaft and said socket for aligning said probe shaft with said socket to eliminate binding therebetween during insertion of the probe shaft in the socket.

3. A probe and socket assembly adapted for use as a mechanical interface between structures, said assembly comprising:
    a socket housing adapted for a rigid connection to a supporting structure, said housing having an axial opening extending therein with said opening and the wall which defines said opening providing a socket;
    a probe comprising a probe shaft and a probe handle adjoining said shaft, said probe further having a bore extending in the longitudinal axial direction of said probe from its handle and into said probe shaft;
    cooperable locking means on said probe shaft and said socket housing, said locking means comprising a groove in the wall which defines said socket and a plurality of locking pins mounted on said probe shaft for radial movement with respect to the longitudinal axis of the probe shaft between a first position wherein said locking pins are removed from said blind bore and project outwardly from the probe shaft and a second position wherein said locking pins are retracted into said probe shaft and project into said probe blind bore;
    means for biasing said locking pins toward said second position projecting into the blind bore;
    an axial pin slidably received in the blind bore in said probe shaft and moveable between a first location in said bore wherein said axial pin engages the locking pins and counteracts said biasing means to maintain the locking pins in their first position removed from said blind bore and projecting outwardly of the probe shaft and said axial pin being movable to a second location in said bore wherein said locking pins are movable by said biasing means to their second position projecting into the blind bore;
    means mounted on said probe handle for biasing said axial pin to said first location in said blind bore; and
    actuator means mounted on said probe handle which are actuatable by gripping of the probe handle by a gripping means to drive said axial pin to said second location which allows said locking pins to project into said blind bore and allow insertion of the probe into said socket, said actuator means being responsive to release of the probe handle by said gripping means to allow said axial pin to return to said first location and thereby drive said locking pins outwardly to engage with said groove when the probe is fully inserted in the socket.

4. A probe and socket assembly as set forth in claim 3 and further including cooperable alignment means on said shaft and said socket for aligning said probe shaft with said socket to accommodate insertion of the probe therein.

5. A probe and socket assembly as set forth in claim 4 wherein said cooperable alignment means comprises a plurality of longitudinally extending splines on the probe shaft and a plurality of longitudinally extending splines on the wall which defines said socket opening, said probe splines being adapted to intermesh with said socket splines when the probe is inserted into the socket.

6. A probe and socket assembly adapted for use as a mechanical interface between structures, said assembly comprising:

a socket housing adapted to be rigidly connected to a supporting structure, said housing having an axial opening extending therein with the wall which defines said opening providing a socket;

a probe comprising a probe shaft and a probe handle adjoining said shaft, said probe further having a bore extending in the longitudinal axial direction of the probe from its handle end into said probe shaft;

first cooperable locking means on said socket housing and said probe shaft for automatically locking the probe shaft in the socket housing when the probe shaft is inserted a predetermined distance therein;

second cooperable locking means on the probe shaft and the socket housing, said second locking means comprising a groove in the wall which defines said socket and at least one locking pin mounted on the probe shaft for radial movement with respect to the longitudinal axis of the probe shaft between a first position wherein said locking pin is removed from said bore and a second position wherein said locking pin projects into said probe blind bore;

means for biasing said locking pin towards said second position projecting into said bore;

an axial pin slidably received in said bore in the probe shaft and moveable between a first location in said bore wherein said axial pin engages the locking pin and counteracts said biasing means to maintain the locking pin in its first position removed from said blind bore and projecting outwardly of the probe shaft and said axial pin being movable to a second location on said bore wherein said locking pin is movable by said biasing means to said second position projecting into the blind bore;

means mounted on the probe handle for biasing said axial pin to said first location in said bore; and actuator means mounted on said probe handle which are actuatable by gripping of the probe handle by a gripping means to drive said axial pin to said second location which allows said locking pin to project into said bore and allow insertion of the probe into said socket, said actuator means being responsive to release of the probe handle by said gripping means to allow said axial pin to return to said first location and drive said locking pin outwardly and engage with said groove when the probe is inserted in the socket a predetermined distance.

7. A probe and socket assembly as set forth in claim 6, wherein said cooperable alignment means comprises a plurality of longitudinally extending splines on said probe shaft and a plurality of longitudinally extending splines on the wall which defines said socket opening, said probe splines being adapted to intermesh with said socket splines when the probe is inserted into the socket.

8. A probe and socket assembly as set forth in claim 6 wherein said first cooperable locking means comprises an external annular groove formed in said probe shaft splines to extend circumferentially about said probe shaft, at least one lock pin mounted on said socket housing for radial movement with respect to the longitudinal axis of said socket between an inner position wherein said lock pin extends into said socket opening and an outer position wherein said lock pin is removed from said socket opening; and spring means for biasing said lock pin towards said inner position whereby said lock pin is adapted to interact with said external annular groove and lock the probe in the socket when the probe is inserted a predetermined distance therein.

9. A probe and socket assembly adapted for use as a mechanical interface between structures, said assembly comprising:

a socket housing adapted to be rigidly connected to a supporting structure, said housing having an axial opening extending therein with the wall which defines said axial opening providing a socket;

a probe comprising a probe shaft and a probe handle adjoining said shaft, said probe further having a bore extending in the longitudinal axial direction of said probe from its handle end into said probe shaft;

cooperable alignment means on said shaft and said socket for aligning said probe shaft with said socket to accommodate insertion of the probe therein;

an automatic cooperable locking means on said socket housing and said probe shaft for automatically soft locking the probe shaft in the socket housing when the probe shaft is inserted a predetermined distance therein, said cooperable alignment means comprising a plurality of longitudinally extending splines on said probe shaft and a plurality of longitudinally extending splines on the wall which defines said socket opening, said probe splines being adapted to intermesh with said socket splines when the probe is inserted into the socket;

automatic cooperable locking means comprising an external annular groove formed in said probe shaft splines to extend circumferentially about said probe shaft, a plurality of lock pins mounted on said socket housing for radial movement with respect to the longitudinal axis of said socket between an inner socket opening and an outer position wherein said lock pins are removed from said socket opening;

spring means for biasing said lock pins toward said inner position whereby said lock pins are adapted to interact with said external annular groove and locks the probe in the socket when the probe is inserted said predetermined distance therein;

cooperable hard locking means on said probe shaft and said socket housing for hard locking of the probe in said socket, said hard locking means being releasable to permit withdrawal of said probe; and actuation means mounted on the probe responsive to the grip of the probe handle by a gripping device for conditioning the probe for insertion and withdrawal and responsive to release of the grip of the probe handle to actuate the hard locking means to provide the hard lock of the probe in the socket.

10. A probe and socket assembly as set forth in claim 9 wherein said bore is a blind bore.

* * * * *